Dec. 10, 1957   Q. H. DOUDEN   2,816,205
ELECTRIC HEATING DEVICES
Filed Feb. 13, 1953   2 Sheets-Sheet 1

INVENTOR.
QUENTIN H. DOUDEN
BY
*Michael Williams*
ATTORNEY

Dec. 10, 1957   Q. H. DOUDEN   2,816,205
ELECTRIC HEATING DEVICES
Filed Feb. 13, 1953   2 Sheets-Sheet 2
Fig. 3
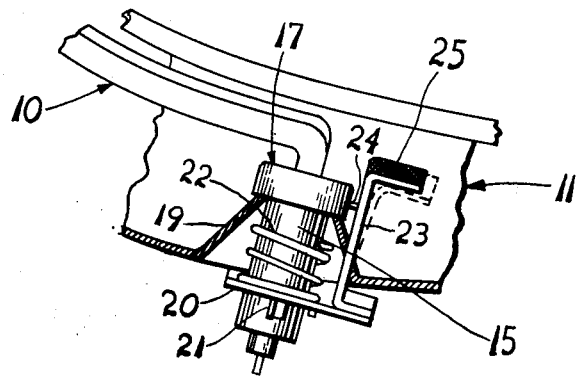
Fig. 4
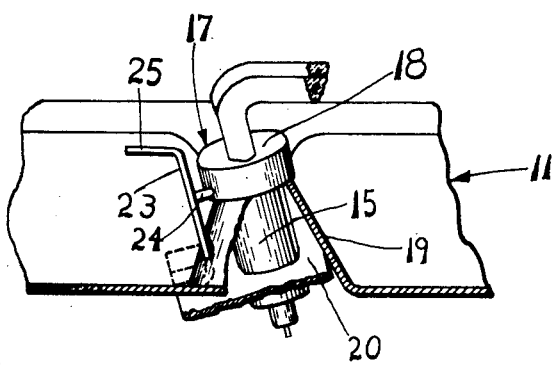
Fig. 5
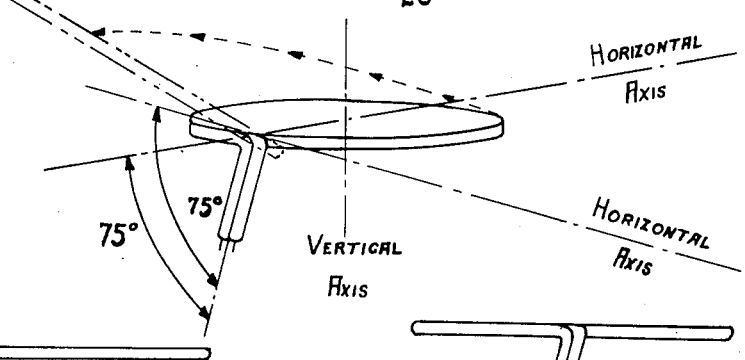
Fig. 6   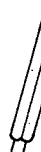   Fig. 7
INVENTOR.
QUENTIN H. DOUDEN
BY
ATTORNEY

United States Patent Office 2,816,205
Patented Dec. 10, 1957

2,816,205

ELECTRIC HEATING DEVICES

Quentin Herbert Douden, Pittsburgh, Pa., assignor to Edwin L. Wiegand Company, Pittsburgh, Pa., a corporation of Pennsylvania Application February 13, 1953, Serial No. 336,837

8 Claims. (Cl. 219—37)

My invention relates to electric heating devices, more particularly to range-type electric heating devices shiftable for cleaning purposes, and the principal object of my invention is to provide new and improved electric heating devices of the character described.

Many prior attempts have been made to provide a range-type electric heating device that is shiftable to permit cleaning of the heating element and cleaning of a reflector which usually underlies the heating element in its normal heating position. These prior attempts have enjoyed a certain degree of consumer acceptance; however, they have not been entirely successful because they have been expensive to manufacture and troublesome to maintain. Additionally, most of these prior art devices created a hazard for the user since it was necessary that the heating element itself be grasped in order to effect the shifting movement.

My invention is relatively inexpensive to manufacture and is safe and convenient to use. These and other advantages will become apparent from a study of the following description and of the drawings appended hereto.

In the drawings accompanying this specification and forming a part of this application there is shown, for purposes of illustration, an embodiment which my invention may assume, and in these drawings:

Figure 3 is a fragmentary view generally corresponding to the line 3—3 of Figure 2, certain parts being broken away to better illustrate interior construction, Figure 4 is a fragmentary sectional view generally corresponding to the line 4—4 of Figure 1, certain parts being broken away and certain parts being removed in the interest of clarity.

Figure 5 is a perspective, diagrammatic view illustrating the relative disposition of the various axes with respect to the plane of my heating device, and Figures 6 and 7 are diagrammatic elevational views further illustrating the relative position of the various axes.

Figure 1:
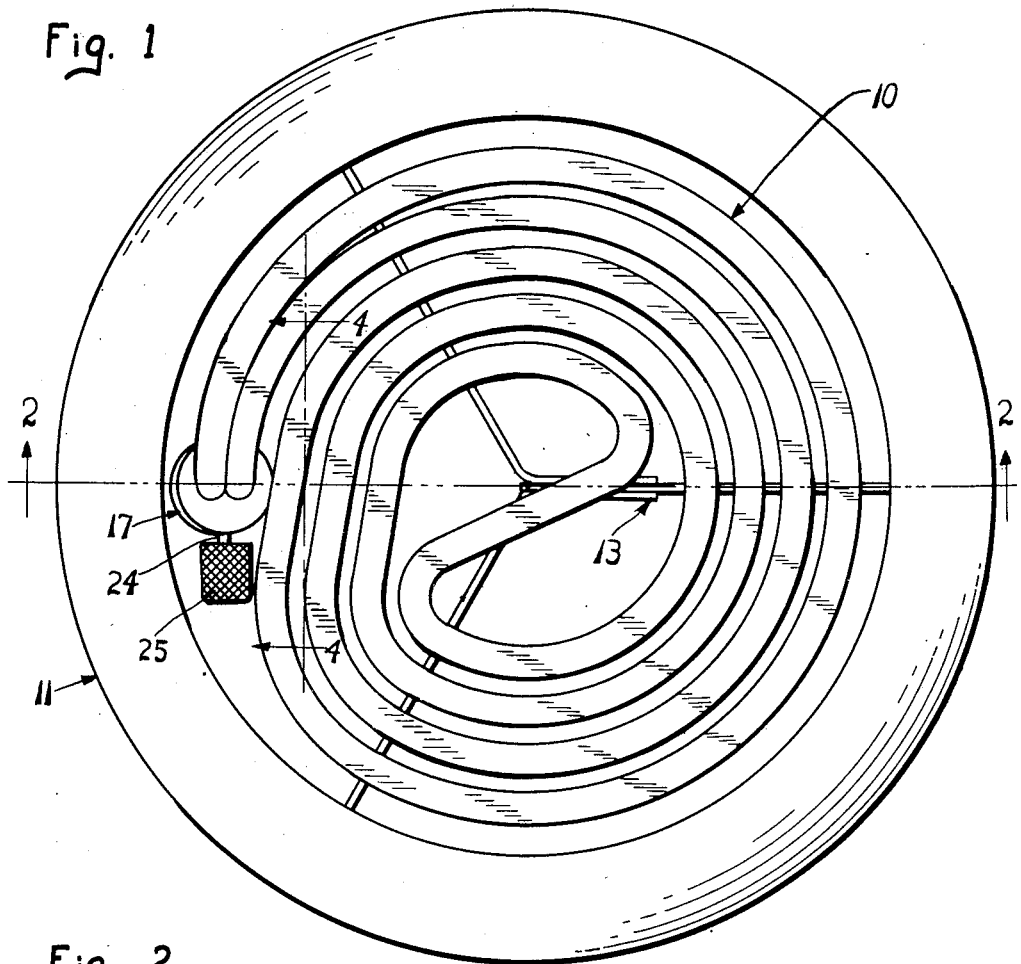
Figure 1 is a top plan view of a range-type electric heating device embodying my invention.
Figure 2:
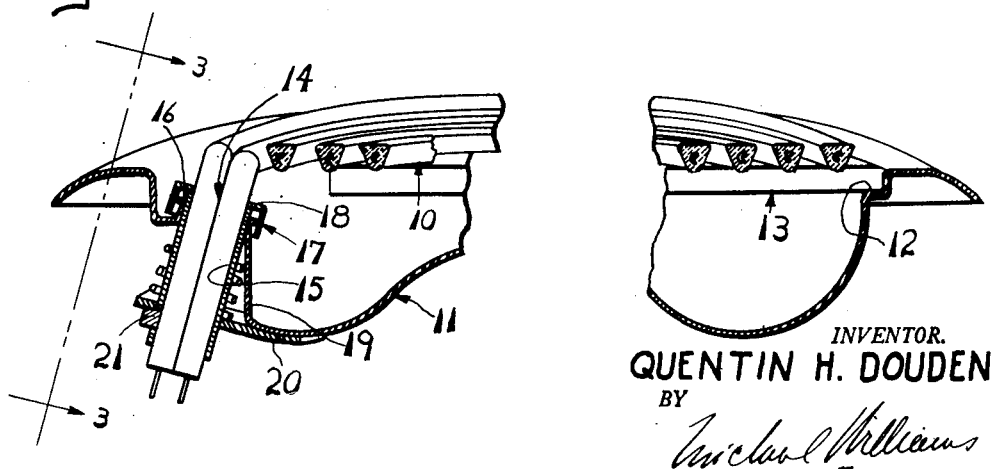
Figure 2 is a fragmentary sectional view taken longitudinally through the pivotal axis of the heating device and generally corresponding to the line 2—2 of Figure 1.

As best seen in Figures 1 and 2, my heating device comprises a conventional sheathed heating element 10 arranged in generally volute form to provide a concentrated heating area. A reflector 11 underlies the heating element 10 for reflecting the heat radiated therefrom and the reflector is adapted to be secured to the top of a range or the like in any suitable manner. As illustrated, the reflector 11 is formed to provide a ledge 12 which supports a spider 13, the element 10, in its normal heat dispensing position, engaging the upper surface of the spider and being supported thereby in the well-known manner.

The element 10 has its opposite terminal portions brought together at 14 to provide an axis about which the element is rotatable. As shown in Figure 2, a cylindrical sleeve 15 is brazed or otherwise secured about the terminal portions of the element 10 and a washer-like annular member 16 is secured to the sleeve 15 to provide a thrust shoulder for a purpose that will later become clear. The terminal portions of the element 10 extend beyond the sleeve 15 as shown, suitable electrical connections being made to the resistance wire within the sheath in any conventional manner.

A cup-shaped umbrella 17, having its transversely disposed wall portion 18 apertured to pass the juxtaposed terminal portions of the element 10, is adapted to be secured above the sleeve 15 and to the element 10 by brazing or other suitable means. As will be obvious, the umbrella 17 protects the pivot mechanism from drippings.

As illustrated in the drawings, the reflector 11 is formed to provide a boss 19 that has its upper portion apertured as shown to closely receive the sleeve 15. The boss 19 therefore provides a journal in which the sleeve 15 is rotatable and the member 16, as before mentioned, provides a thrust shoulder for orienting the sleeve in an axial direction.

Means are provided for further rotatably supporting the sleeve 15 and presently comprises a support 20 that is secured by welding or the like to the reflector 11 and is apertured to closely receive the sleeve 15. In the present embodiment, the sleeve 15 may be secured against unintentional disassembly with the reflector 11 by providing the sleeve 15 with one or more tabs 21. As will be clear, these tabs 21 may be bent outwardly of the sleeve 15 at assembly so as to engage under the support 20.

Spring means are provided to effect shifting of the element 10 about its pivot, such spring means presently comprising a torsion spring 22 disposed about the sleeve 15 and having one end thereof anchored to the support 20 and having the other end thereof anchored to the sleeve. It is presently preferred to so arrange the spring 22 that the element 10 will be shifted in a counterclockwise direction from the normal heat dispensing position shown in Figure 1 to a cleaning position wherein the element 10 is spaced to one side of the reflector 11.

As best shown in Figures 3 and 4, latch means are provided to hold the element 10 in its heat dispensing position centered above the reflector 11 against the urging of the spring 22. The latch means, in the presently disclosed embodiment, is disposed adjacent the pivotal axis of the heating device and comprises a generally flat spring member 23 secured to the support 20 and extending upwardly through an aperture in the reflector.

A pin 24 is secured to the member 23 and extends laterally thereof as shown, and an aperture is provided in the umbrella 17 in position to register with the pin 24 when the element 10 is disposed in its normal heat dispensing position. As illustrated, the member 23 is bent to provide a portion 25 by which the latch means may be operated; however, if desired, material having low heat conductance may be employed for the portion 25.

With particular reference to Figures 5, 6 and 7, it will be seen that the axis about which the element 10 pivots is disposed at an acute angle with the plane of the element. As indicated, it has been found that operation of the device will be satisfactory when the pivotal axis is disposed generally at a 75° angle with respect to each of the two horizontal axes shown in Figure 5. It is to be understood however, that these angles are not critical and that they may be varied considerably providing that the element 10 spirals away from and to one side of its normal heat dispensing position as it is rotated in one direction about its pivot.

From the foregoing, it will be clear that shifting of the element 10 from its normal heat dispensing position overlying the reflector 11 and the supporting spider 13 will be accomplished by simply pressing downwardly upon the portion 25 of the latch mechanism. This will move the member 23 to the dotted line position shown in Figure 3 and thus withdraw the pin 24 from its aperture in the umbrella 17. As soon as the pin 24 has been withdrawn from its aperture in the umbrella 17, spring 22 will rotate element 10 approximately 180° (see Figure 5).

As will now be clear, the disposition of the axis about which the element 10 pivots is such that initial movement of the element 10 is in a generally edgewise direction. Furthermore, it will be evident that as the element rotates about its pivot from its normal heat dispensing position, any given point on the element describes a path spiraling away from and to one side of the reflector 11.

After the element 10 has been shifted to the dot-dash position shown in Figure 5, the lower surface of the element 10 may be cleaned and the reflector 11 may also be cleaned after removal of the spider 13. After cleaning, the spider 13 may be replaced and the element 10 then rotated against the tension of the spring 22 until the element once again is in its normal heat dispensing position resting upon the spider 13 as shown in Figures 1 and 2. It will be understood that the pin 24, under the urging of the spring member 23, will re-enter the aperture in the umbrella 17 and thus once again lock the element 10 in its normal heat dispensing position.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A shiftably mounted electric heating device, comprising a heating element, means providing an axis about which said element is rotatable to and from a normal heat dispensing position, resilient means for rotating said heating element about said axis, and means for releasably holding said heating element against the urging of said resilient means.

2. An electric heating device, comprising a convoluted sheathed resistance element providing a generally flat heating surface, reflector means cooperable with said heating element, terminal means extending from said element in spaced relation to the axis of said convolutions, said terminal means providing an axis about which said element is rotatable in generally edgewise relation to and from cooperable relation with said reflector means, spring means disposed coaxially with respect to said terminal means for rotating said heating element about the axis provided by said terminal means and in a direction to move said element away from cooperable relation with said reflector means, and means for releasably holding said heating element in cooperable relation with said reflector means against the urging of said spring means.

3. An electric heating device, comprising a convoluted sheathed resistance element providing a generally flat heating surface, reflector means cooperable with said heating element, terminal means extending from said element in spaced relation to the axis of said convolutions, said terminal means providing an axis about which said element is shiftable to and from cooperable relation with said reflector means and the axis provided by said terminal means being inclined with respect to the plane of said element so that in movement in one direction about said axis, said element spirals away from and to one side of said reflector means, spring means disposed coaxially with respect to said terminal means for rotating said heating element about the axis provided by said terminal means and in a direction to move said element away from cooperable relation with said reflector means, and means for releasably holding said element in cooperable relation with said reflector means against the urging of said spring means.

4. An electric heating device comprising a heating element adapted to be supported in a heat dispensing position in a predetermined plane, and support means for said element providing a bearing adjacent one side of said element about the axis of which said element is rotatable edgewise in a predetermined direction to one side of said position, the axis of said bearing intersecting said plane at an angle of less than ninety and more than forty-five degrees to provide for simultaneous lateral shifting of said element from said position during such edgewise rotation.

5. An electric heating device comprising an elongated sheathed resistor element providing an intermediate heat generating portion adapted to be supported in a predetermined heat dispensing position and terminal end portions through which current is adapted to be passed to said intermediate portion, said heat generating portion comprising one or more convolutions lying in a substantially common plane and said terminal end portions extending from said intermediate portion and disposed adjacent one side of said intermediate portion in generally side-by-side parallel relation, and support means for said element providing a bearing adjacent said element and cooperable with said terminal end portions to provide an axis about which the intermediate portion of said element is rotatable edgewise in a predetermined direction to one side of said position, said axis intersecting the plane of said intermediate element portion at an angle of less than ninety and more than forty-five degrees to provide for simultaneous lateral shifting of said element from said position during such edgewise rotation.

6. A heater assembly for an apertured stove panel, comprising an adaptor ring supported by said panel in position to overlie said panel opening, a sheathed heating element having a spiral planar active heating portion normally disposed in a horizontal heating position plane within said adaptor ring, said heating element having a plurality of non-heating terminal portions extending downwardly from the plane of said active heating portion and grouped together at the periphery of said spiral active heating portion in parallel closely disposed relation, a sleeve enclosing said grouped terminal ends and fixed thereto, said adaptor ring having bearing means for rotatably mounting said sleeve, said sleeve and said bearing means having interengaging parts to hold the sleeve against axial displacement relative to the ring, whereby said heating element may be rotated about the axis of said bearing means into and out of the horizontal plane of its said heating position within said adaptor ring.

7. The construction of claim 6 wherein said bearing means comprises a bracket secured to said adaptor ring and in which said sleeve is journaled.

8. The construction of claim 6 and further including spring means for rotating said heating element out of its heating position, and latch means for holding said heating element in its heating position against the force of said spring means.

References Cited in the file of this patent

UNITED STATES PATENTS

| | | |
|---|---|---|
| 1,998,308 | Causse | Apr. 16, 1935 |
| 2,028,604 | Hermanni | Jan. 21, 1936 |
| 2,506,554 | Tuttle | May 2, 1950 |
| 2,508,552 | Tuttle | May 23, 1950 |
| 2,610,281 | Rutenber et al. | Sept. 9, 1952 |
| 2,615,117 | Tillapaugh | Oct. 21, 1952 |
| 2,632,837 | Andersen | Mar. 24, 1953 |